(12) United States Patent
Coban et al.

(10) Patent No.: US 9,350,781 B2
(45) Date of Patent: May 24, 2016

(54) SINGLE NETWORK ABSTRACTION LAYER UNIT PACKETS WITH DECODING ORDER NUMBER FOR VIDEO CODING

(71) Applicant: QUALCOMM Incorporated, San Diego, CA (US)

(72) Inventors: Muhammed Zeyd Coban, Carlsbad, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 14/290,537

(22) Filed: May 29, 2014

(65) Prior Publication Data

US 2014/0355616 A1    Dec. 4, 2014

Related U.S. Application Data

(60) Provisional application No. 61/829,950, filed on May 31, 2013.

(51) Int. Cl.
| | | |
|---|---|---|
| *H04L 29/06* | (2006.01) | |
| *H04N 21/2381* | (2011.01) | |
| *H04N 21/438* | (2011.01) | |
| *H04N 21/6336* | (2011.01) | |
| *H04N 21/6437* | (2011.01) | |
| *H04N 21/845* | (2011.01) | |

(52) U.S. Cl.
CPC ............ *H04L 65/607* (2013.01); *H04L 65/608* (2013.01); *H04N 21/2381* (2013.01); *H04N 21/4381* (2013.01); *H04N 21/6336* (2013.01); *H04N 21/6437* (2013.01); *H04N 21/8451* (2013.01)

(58) Field of Classification Search
CPC . H04L 65/607; H04L 65/608; H04N 21/2381
See application file for complete search history.

(56) References Cited

U.S. PATENT DOCUMENTS

| 2005/0002525 A1* | 1/2005 | Alkove | ................... H04L 29/06 380/37 |
|---|---|---|---|
| 2005/0254427 A1 | 11/2005 | Leon et al. | |
| 2014/0294064 A1 | 10/2014 | Wang | |

(Continued)

FOREIGN PATENT DOCUMENTS

WO     2004075555 A1     9/2004

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Albert T Chou
(74) *Attorney, Agent, or Firm* — Shumaker & Sieffert, P.A.

(57) ABSTRACT

A method for processing video data in a real-time transport protocol (RTP) payload includes encapsulating video data in a single network abstraction layer (NAL) unit packet for an RTP session. The single NAL unit packet contains a single NAL unit. The method may also include encapsulating decoding order number information in the single NAL unit packet based on at least one of: the RTP session being in a multi-stream transmission (MST) mode, or a maximum number of NAL units that may precede the NAL unit in a de-packetization buffer in reception order and follow the NAL unit in decoding order being greater than 0.

24 Claims, 12 Drawing Sheets

(56) References Cited

U.S. PATENT DOCUMENTS

| | | | |
|---|---|---|---|
| 2014/0294092 A1 | 10/2014 | Wang | |
| 2014/0294093 A1 | 10/2014 | Wang | |
| 2015/0110118 A1* | 4/2015 | Ouedraogo | ............. H04L 65/00 370/394 |
| 2015/0189336 A1* | 7/2015 | Wang | ................. H04N 21/2225 725/62 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Carminati, et al., "Towards Scalable Audiovisual Broadcasting Networks: Overview of the Toscane Project", International Broadcasting Conference 2009; Amsterdam Sep. 9, 2009, XP030081693, 11 pp.
Schierl, et al., "RTP Payload Format for High Efficiency Video Coding; draft-schierl-payload-rtp-h265-01.txt", RTP Payload Format for High Efficiency Video Coding, draft-schierl-payload-rtp-h265-01.txt, Internet Engineering Task Force, IETF, Standardworkingdraft, Internet Society (ISOC) 4, Rue Des Falaises CH-1205 Geneva, Switzerland, Oct. 22, 2012, XP015088411, 45 pp.
Schierl, et al., "RTP Payload Format for High Efficiency Video Coding; draft-schierl-payload-rtp-h265-02.txt", RTP Payload Format for High Efficiency Video Coding, draft-schierl-payload-rtp-h265-02.txt, Internet Engineering Task Force, IETF, Standardworkingdraft, Internet Society (ISOC) 4, Rue Des Falaises CH-1205 Geneva, Switzerland, Jun. 11, 2013, XP015090627, 69 pp.
Wang, et al., RTP Payload Format for H.264 Video; RFC 6184, RTP Payload Format for H.264 Video, RFC6184.txt, Internet Engineering Task Force, IETF, Standard, Internet Society (ISOC) 4, Rue Des Falaises CH-1205 Geneva, Switzerland, May 4, 2011, XP015075997, 101 pp.
Wang, et al., RTP Payload Format for Scalable Video Coding; RFC 6190; RTP Payload Format for Scalable Video Coding RFC6190.Txt, Internet Engineering Task Force, IETF; Standard, Internet Society (ISOC) 4, Rue Des Falaises CH-1205 Geneva, Switzerland, May 7, 2011, XP015075999, 100 pp [uploaded in parts].
Wang, et al., "RIP Payload Format for Scalable Video Coding; draft-ietf-avt-rtp-svc-27.txt", RTP Payload Format for Scalable Video Coding; draft-ietf-avt-rip-svc-27.txt, Internet Engineering Task Force, IETF; Standardworkingdraft, Internet Society (ISOC) 4, Rue Des Falaises CH-1205 Geneva, Switzerland, No. 27, Feb. 2, 2011, XP015073785, 105 pp.
Schulzrinne, et al., "RTP: A Transport Protocol for Real-Time Applications," Network Working Group, RFC 3550, Jul. 2003, 89 pp.
ITU-T H.223, Series H: Audiovisual and Multimedia Systems, Infrastructure of audiovisual services—Transmission mutiplexing and synchronization, Multiplexing protocol for low bit rate multimedia communication; The International Telecommunication Union. Jul. 2001, 74 pp.
Ott, et al., "RTP Payload Format for ITU-T Rec. H.263 Video," Network Working Group, RFC 4629, Jan. 2007, 29 pp.
International Search Report and Written Opinion from International Application No. PCT/US2014/040318, dated Sep. 15, 2014, 12 pp.
Second Written Opinion from International Application No. PCT/US2014/040318, dated Apr. 1, 2015, 97 pp.
International Preliminary Report on Patentability from International Application No. PCT/US2014/040318, dated Aug. 13, 2015, 11 pp.

* cited by examiner

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| F | Type | | | | | | | LayerId | | | | | TID | | |

FIG. 2

SINGLE NETWORK ABSTRACTION LAYER UNIT PACKETS WITH DECODING ORDER NUMBER FOR VIDEO CODING

This application claims the benefit of U.S. Provisional Patent Application No. 61/829,950, filed May 31, 2013, the entire content of which is incorporated herein by reference.

TECHNICAL FIELD

This disclosure relates to the processing of video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Video data may be transmitted and received using one or more protocols. Each protocol may specify various content and format requirements for transmission and/or reception of the data when using the protocol. For instance, some protocols may separate a stream or set of data into chunks for transportation via one or more networks. In some protocols, this separation procedure may be referred to as packetization or framing.

SUMMARY

Techniques of the present disclosure provide methods and apparatuses for processing video data that is sent and received using a network protocol, such as the Real-time Transport Protocol (RTP). More specifically, the techniques described herein provide a single NAL unit packet format usable with various transmission parameters and modes.

In one example of the disclosure, a method of processing video data in a real-time transport protocol (RTP) payload includes encapsulating video data in a single network abstraction layer (NAL) unit packet for an RTP session, where the single NAL unit packet contains a single NAL unit, and encapsulating decoding order number information in the single NAL unit packet based on at least one of: the RTP session being in a multi-stream transmission (MST) mode, or a maximum number of NAL units that may precede the NAL unit in a de-packetization buffer in reception order and follow the NAL unit in decoding order being greater than 0.

In another example of the disclosure, a method of processing video data in a real-time transport protocol (RTP) payload includes decapsulating video data that is encapsulated in a single network abstraction layer (NAL) unit packet for an RTP session, where the single NAL unit packet contains a single NAL unit, and decapsulating decoding order number information that is encapsulated in the single NAL unit packet based on at least one of: the RTP session being in a multi-stream transmission (MST) mode, or a maximum number of NAL units that may precede the NAL unit in a de-packetization buffer in reception order and follow the NAL unit in decoding order being greater than 0.

In another example of the disclosure, an apparatus configured to process video data in a real-time transport protocol (RTP) payload includes a memory configured to store video data and a processor configured to: encapsulate, within a real-time transport protocol (RTP) payload, video data in a single network abstraction layer (NAL) unit packet for an RTP session, where the single NAL unit packet contains a single NAL unit, and encapsulate decoding order number information in the single NAL unit packet based on at least one of: the RTP session being in a multi-stream transmission (MST) mode, or a maximum number of NAL units that may precede the NAL unit in a de-packetization buffer in reception order and follow the NAL unit in decoding order being greater than 0.

In another example of the disclosure, An apparatus configured to process video data in a real-time transport protocol (RTP) payload includes means for encapsulating video data in a single network abstraction layer (NAL) unit packet for an RTP session, where the single NAL unit packet contains a single NAL unit, and means for encapsulating decoding order number information in the single NAL unit packet based on at least one of: the RTP session being in a multi-stream transmission (MST) mode, or a maximum number of NAL units that may precede the NAL unit in a de-packetization buffer in reception order and follow the NAL unit in decoding order being greater than 0.

The details of one or more examples are set forth in the accompanying drawings and the description below. Other

BRIEF DESCRIPTION OF DRAWINGS

FIG. 2 is a conceptual diagram showing the structure of an HEVC network abstraction layer (NAL) unit header.

DETAILED DESCRIPTION

This disclosure introduces various techniques and devices for packetizing video data. In one or more examples, this disclosure proposes improved designs of a real-time transport protocol (RTP) payload format for transporting video data. In particular, this disclosure proposes techniques for signaling a decoding order number (DON) for single network abstraction layer (NAL) unit RTP packets. Previous techniques for transmitting single NAL unit packets were incompatible with certain transmission modes and transmission parameters. Instead, previous techniques required single NAL units to be transmitted in an aggregation packet, incurring increased overhead and decreased throughput. By including decoding order number information in a flexible single NAL unit packet, the techniques described herein may allow for more efficient transmission of single NAL units and enable use of single NAL unit packets with various transmission modes and transmission parameters.

Figure 1:
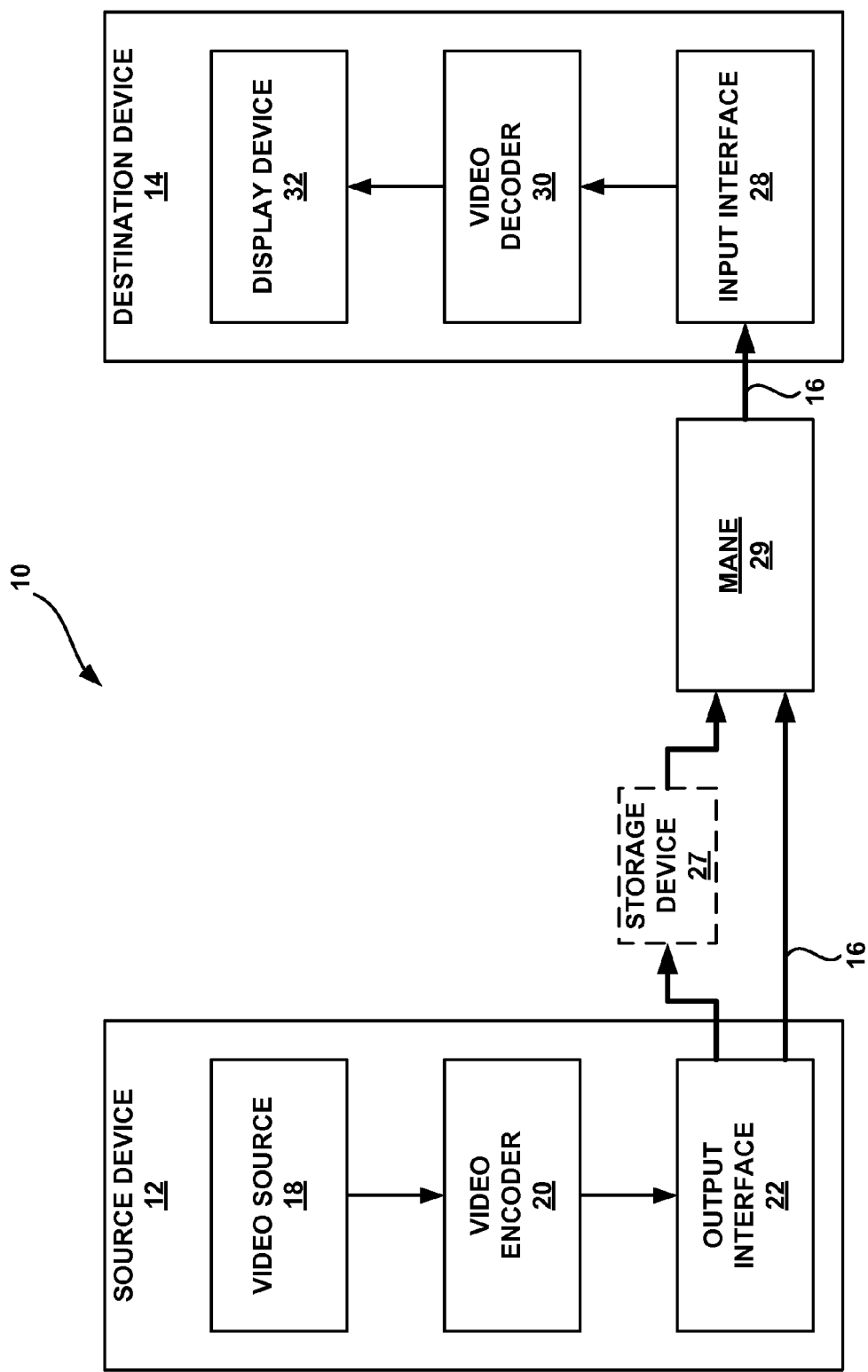
FIG. 1 is a conceptual diagram illustrating an example video encoding and decoding system that may utilize the techniques described in this disclosure.

FIG. 1 is a block diagram illustrating an example video processing system 10 that may be used in conjunction with the techniques described in this disclosure. System 10, for example, may be configured to generate, process, and transmit video data using the RTP techniques described in this disclosure. As shown in FIG. 1, system 10 includes a source device 12 that generates encoded video data to be decoded at a later time by a destination device 14. The encoded video data may be routed from source device 12 to destination device 14 by media aware network element (MANE) 29. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

System 10 may operate in accordance with different video coding standards, a proprietary standard, or any other way of multiview coding. For example, video encoder 20 and video decoder 30 may operate according to a video compression standard, such as ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The recent, publicly available joint draft of the MVC extension is described in "Advanced video coding for generic audiovisual services," ITU-T Recommendation H.264, March 2010. A more recent, publicly available joint draft of the MVC extension is described in "Advanced video coding for generic audiovisual services," ITU-T Recommendation H.264, June 2011. A current joint draft of the MVC extension has been approved as of January 2012.

In addition, there is a new video coding standard, namely the High Efficiency Video Coding (HEVC) standard, that has been developed by the Joint Collaboration Team on Video Coding (JCT-VC) of ITU-T Video Coding Experts Group (VCEG) and ISO/IEC Motion Picture Experts Group (MPEG). One draft of the HEVC standard, referred to as "HEVC Working Draft 10" or "WD10," is described in document JCTVC-L1003v34, Bross et al., "High efficiency video coding (HEVC) text specification draft 10," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which, as of Apr. 30, 2014, is downloadable from http://phenix.int-evry.fr/jct/doc_end_user/documents/12_Geneva/wg11/JCTVC-L1003-v34.zip. The entire content of HEVC WD10 is hereby incorporated herein by reference.

For purposes of description, video encoder 20 and video decoder 30 are described in context of the HEVC or the H.264 standard and the extensions of such standards. The techniques of this disclosure, however, are not limited to any particular coding standard. Other examples of video compression standards include MPEG-2 and ITU-T H.263. Proprietary coding techniques, such as those referred to as On2 VP6/VP7/VP8, may also implement one or more of the techniques described herein. The techniques of this disclosure are potentially applicable to several video coding standards, including HEVC and others.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Link 16 may include one or more MANEs, such as MANE 29, that route the video data from source device 12 to destination device 14.

Alternatively, encoded data may be output from output interface 22 to a storage device 27. Similarly, encoded data may be accessed from storage device 27 by input interface. Storage device 27 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 27 may correspond to a file server or another intermediate storage device that may hold the encoded video generated by source device 12.

Destination device 14 may access stored video data from storage device 27 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 27 may be a streaming transmission, a download transmission, or a combination of both. Video data retrieved from storage device 27 may be routed to destination device 14 using one or more MANEs, such as MANE 29.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. For instance, output interface 22 may include an RTP packetization unit operable to encapsulate data in RTP payloads in accordance with the techniques described herein. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by source device 12. The encoded video data may be transmitted directly to destination device 14 via output interface 22 of source device 12. The encoded video data may also (or alternatively) be stored onto storage device 27 for later access by destination device 14 or other devices, for decoding and/or playback.

Destination device 14 includes an input interface 28, a video decoder 30, and a display device 32. In some cases, input interface 28 may include a receiver and/or a modem. For instance, input interface 28 may include an RTP de-packetization unit operable to decapsulate data encapsulated in RTP payloads in accordance with the techniques described herein. Input interface 28 of destination device 14 receives the encoded video data over link 16. The encoded video data communicated over link 16, or provided on storage device 27, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Encoded video data, such as video data encoded in accordance with the HEVC standard or other standards, may be transmitted between two devices (e.g., between source device 12 and destination device 14) using various methods. For instance, video data may be transmitted via one or more networks using various network protocols. Some protocols may specify various parameters and/or rules for transmission. For instance, some protocols may process data before transmission via a network, and reprocess the data upon receipt. In some examples, processing data (e.g., encoded video data) may include separating the data into a number of chunks (e.g., packetizing or framing the data). One example of a protocol for transmitting video data for real-time streaming applications is the real-time transport protocol (RTP).

RTP is a transport protocol that is specified in IETF RFC 3550, which, as of 30 Apr. 2014, is available from http://www.ietf.org/rfc/rfc3550.txt, and which is hereby incorporated by reference in its entirety. In general, RTP defines a standardized packet format for delivering audio and/or video over IP networks. RTP may be used to provide various streaming media, such as telephony services, video teleconferencing, television services, or others.

To transport video data encoded according to a video codec over RTP, an RTP payload format for the video codec needs to be specified. For example, RFC 6184 (which, as of 30 Apr. 2014, is available at http://www.ietf.org/rfc/rfc6184.txt) specifies the RTP payload format for H.264 video and RFC 6190 (which, as of 30 Apr. 2014, is available at http://www.ietf.org/rfc/rfc6190.txt) specifies the RTP payload format for SVC video. Both RFC 6184 and RFC 6190 are hereby incorporated by reference in their entirety. RFC 4629 specifies the RTP payload format for ITU-T Rec. H.263.

In addition, there is a new RTP payload specification, namely the RTP Payload Format for High Efficiency Video Coding (HEVC), being developed by the Internet Engineering Task Force (IETF), Audio/Video Transport Payload Working Group. A recent draft of the RTP payload format for HEVC video is available, as of 30 Apr. 2014, from http://www.ietf.org/id/draft-ietf-payload-rtp-h265-02.txt, and is hereby incorporated by reference in its entirety.

The latest design of HEVC RTP Payload Format, including improvements described in U.S. Provisional Application No. 61/806,705, filed Mar. 29, 2103, which is hereby incorporated by reference it its entirety, enables transmission of an HEVC bitstream over a single RTP session (e.g., a single RTP stream) or multiple RTP sessions (e.g., multiple RTP streams). An RTP stream may be a sequence of RTP packets carried in a single RTP session. An RTP session may correspond to an IP address and a pair of ports for receiving RTP and RTP Control Protocol (RTCP) data. RTCP may generally provide out-of-band statistics and control information for an associated RTP stream.

Some concepts and working principles of the HEVC RTP Payload Format are inherited from RFC 6190 and follow a similar design. If only one RTP session (e.g., one RTP stream) is used for transmission of the HEVC bitstream, the transmission mode is referred to as single-session (or single-stream) transmission (SST); otherwise (e.g., if more than one RTP session is used for transmission of the HEVC bitstream), the transmission mode is referred to as multi-session (or multi-stream) transmission (MST). SST is typically used for point-to-point unicast scenarios, while MST is used for point-to-multipoint multicast scenarios where different receivers require different operation points of the same HEVC bitstream, to improve bandwidth utilizing efficiency. The transmission mode, whether SST or MST is used, is signaled by the media type parameter, tx-mode, which can be expressed as a Session Description Protocol (SDP) parameter (e.g., during setup of the RTP session).

Another parameter that may be specified as a SDP parameter is the sprop-depack-buf-nalus parameter. Sprop-depack-buf-nalus is a session parameter that specifies the maximum number of NAL units that may precede a NAL unit in the de-packetization buffer (e.g., the RTP receiver buffer) in reception order and follow the NAL unit in decoding order. The decoding order, generally, may indicate an order in which NAL units are to be decoded by a video decoder. Consequently, a video decoder and/or de-packetization unit may utilize the decoding order of received NAL units to determine the order in which to process the NAL units. Therefore, the value of sprop-depack-buf-nalus may indicate the maximum number of NAL units that may be transmitted and/or received out of decoding order.

In one example, the value of the sprop-depack-buf-nalus parameter is an integer in the range of 0 to 32767, inclusive. When not present, the value of the sprop-depack-buf-nalus parameter is inferred to be equal to 0. When the RTP session depends on one or more other RTP sessions (in this case the transmission mode is equal to "MST"), the value of the sprop-depack-buf-nalus parameter will be greater than 0. A value of greater than zero for the sprop-depack-buf-nalus parameter indicates that the session allows interleaved packetization. In other words when using multiple streams to transmit data units, a receiver buffer and/or de-packetization buffer may be able to handle interleaved packetization (e.g., handle data units transmitted and/or received out of decoding order).

RTP packets are transmitted over a session to carry information (e.g., encoded video data) from one device to another. An RTP packet includes an RTP header and an RTP payload. The RTP header includes a Payload Type field for specifying a payload identifier. The payload identifier indicates the format of the corresponding RTP payload. As defined by the RTP standard, payload identifiers 96-127 are reserved for RTP payloads defined dynamically during a session. That is, a payload identifier value of 96-127 may map RTP payloads to a specified format (or profile) for the duration of the corresponding RTP session. In some examples, a specified format for the RTP payloads of a session may be defined using an SDP parameter. For instance, an SDP parameter may specify that, for a particular session, a payload identifier value of 98 indicates an HEVC profile for the RTP payloads. Thus, RTP packets sent over the session may include RTP payloads that contain video data encoded using the HEVC standard. As such, RTP payloads may include NAL units.

In one example of an HEVC profile for RTP payloads, the first two bytes of the RTP payload may represent the RTP payload header. For some RTP payloads adhering to the RTP payload format for HEVC, the RTP payload header consists of the same fields as the NAL unit header for HEVC.

Figure 2:
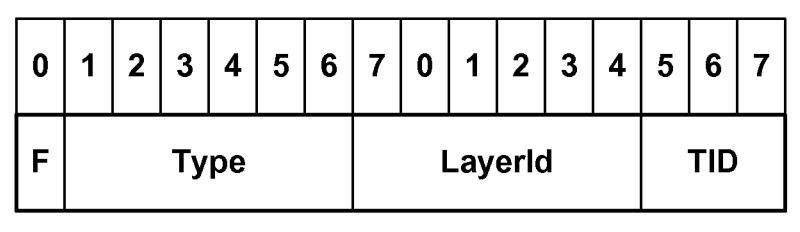

FIG. 2 is a conceptual diagram showing the structure of an HEVC NAL unit header. Generally, HEVC maintains the NAL unit concept of H.264, with a few modifications. The semantics of the fields in the NAL unit header are as specified in HEVC WD10 and are described briefly below for convenience. In addition to the name and size of each field, the corresponding syntax element name in HEVC WD10 is also provided. For purposes of description, the payload data of a NAL unit refers herein to the portion of the NAL unit that excludes the NAL unit header. That is, a NAL unit may consist of a NAL unit header (e.g., bytes 1 and 2 of the NAL unit) and a NAL unit payload (e.g., bytes 3 to N of the NAL unit).

The syntax element F, as shown in the example of FIG. 1, is a single bit and is referred to as the forbidden_zero_bit. In accordance with HEVC WD10, F has a value of zero. That is, HEVC WD10 specifies that a value of 1 for the syntax element F constitutes a syntax violation. The inclusion of this bit in the NAL unit header is to enable transport of HEVC video over MPEG-2 transport systems (e.g., to avoid start code emulations).

As shown in the example of FIG. 2, a NAL unit header also includes the syntax element Type. The Type syntax element is 6 bits in length and is referred to as nal_unit_type. This field specifies the NAL unit type as defined in Table 7-1 of HEVC WD10. For a reference of all currently defined NAL unit types and their semantics, refer to Section 7.4.1 in HEVC WD10.

The syntax element LayerID, as shown in the example of FIG. 2, is also included in the NAL unit header. The LayerID syntax element is 6 bits in length and is referred to as nuh_layer_id. Currently HEVC WD10 specifies that LayerID should be equal to a value of zero. In future scalable or 3D video coding extensions of HEVC, the LayerID syntax element may be used to identify additional layers that may be present in the coded video sequence, such as a spatial scalable layer, a quality scalable layer, a texture view, or a depth view.

As shown in the example of FIG. 2, the NAL unit header also includes the syntax element TID. The TID syntax element is 3 bits in length and is referred to as nuh_temporal_id_plus1. The TID syntax element specifies the temporal identifier of the NAL unit plus 1. The value of TemporalID is thus equal to TID minus 1. A TID value of 0 is not allowed in HEVC WD10 to ensure that there is at least one bit in the NAL unit header equal to 1, so as to prevent start code emulations in the NAL unit header.

In the HEVC payload specification for RTP, four different types of RTP payload structures are specified. A receiver can identify the type of an RTP payload through the Type field in the RTP payload header.

The four different RTP payload structures for HEVC are as follows:

Single NAL unit packet: A single NAL unit packet contains a single NAL unit (e.g., a NAL unit header and NAL unit payload data) in the RTP payload. Previously, the NAL unit header of the NAL unit would also serve as the RTP payload header. That is, an RTP payload consisting of a single NAL unit packet did not include an RTP payload header and instead relied on the NAL unit header to serve as the RTP payload header.

Aggregation packet (AP): Previously, an AP contained one or more NAL units in the RTP payload. The NAL units of an AP are from within one access unit. An access unit, as defined by HEVC WD10, is a set of NAL units that are associated with each other according to a specified classification rule, are consecutive in decoding order, and contain exactly one coded picture.

Fragmentation unit (FU): An FU contains a subset of a single NAL unit.

Payload Content Information (PACI) carrying RTP packet: A PACI carrying RTP packet contains an RTP payload header (that differs from other payload headers for efficiency), a Payload Header Extension Structure (PHES), and a PACI payload.

Previously, the following packetization rule was specified: When the transmission mode (e.g., tx-mode) is equal to "MST" or the value of the sprop-depack-buf-nalus parameter is greater than 0, single NAL unit packets are not used. In other words, when RTP data was being received via a MST and/or when a de-packetization buffer was allowed to receive RTP packets out of order, NAL units packetized into RTP payloads without a corresponding decoding order number were not allowed, and previous RTP packet formats for a single NAL unit packet did not contain decoding order number information. Without the decoding order number, NAL units cannot be put back in the right order by the RTP receiver. If a single NAL unit was to be transmitted in MST mode or when a de-packetization buffer was specified (e.g., by the sprop-depack-buf-nalus parameter), an AP was used to encapsulate the single NAL unit in one RTP packet. However, encapsulating a single NAL unit in an AP results in increased overhead and decreased bandwidth because an AP includes four bytes of information (namely a NAL unit Size field and an RTP payload header) that are unnecessary when transmitting a single NAL unit.

Figure 3:
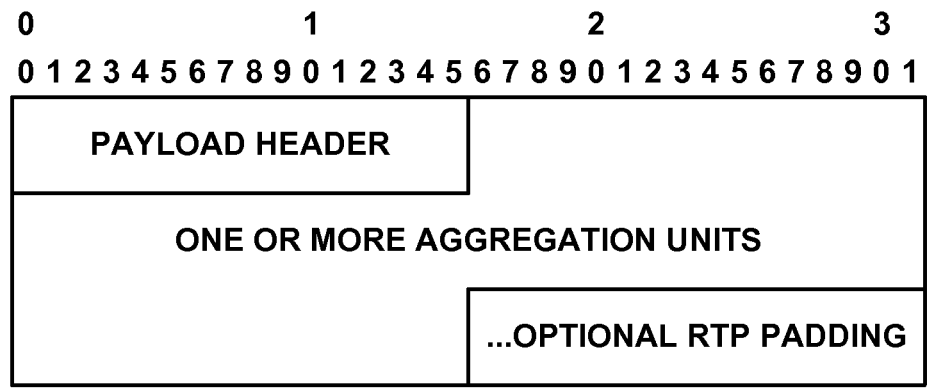
FIG. 3 is a conceptual diagram showing the structure of a real-time transport protocol (RTP) payload format for an aggregation packet.

FIG. 3 is a conceptual diagram showing the structure of a real-time transport protocol (RTP) payload format for an aggregation packet. Aggregation packets (APs) enable the reduction of packetization overhead for small NAL units, such as most of the non-VCL (video coding layer) NAL units, which are often only a few octets in size.

As shown in the example of FIG. 3, an AP includes an RTP payload header, aggregation units, and optional RTP padding. The RTP payload header of an AP follows the same format as a NAL unit header as described in FIG. 2. That is, the RTP payload header of an AP includes the F field, the Type field, the LayerID field, and the TID field. In the RTP payload header of an AP, the F bit is equal to 0 if the F bit of each aggregated NAL unit in the AP is equal to zero. Otherwise, the F bit is equal to 1. The value of the Type field in the RTP payload header of an AP is equal to 48. The value of the LayerID field in the RTP payload header of an AP is equal to the lowest value of LayerID among all the aggregated NAL units in the AP. The value of the TID field in the RTP payload header of an AP is equal to the lowest value of the TID field among all the aggregated NAL units.

An AP aggregates NAL units within one access unit. That is, an AP may include one or more NAL units from the same access unit. Each NAL unit to be carried in an AP is encapsulated in an aggregation unit. NAL units aggregated in one AP are in NAL unit decoding order. An AP can carry as many aggregation units as necessary.

Figure 4:
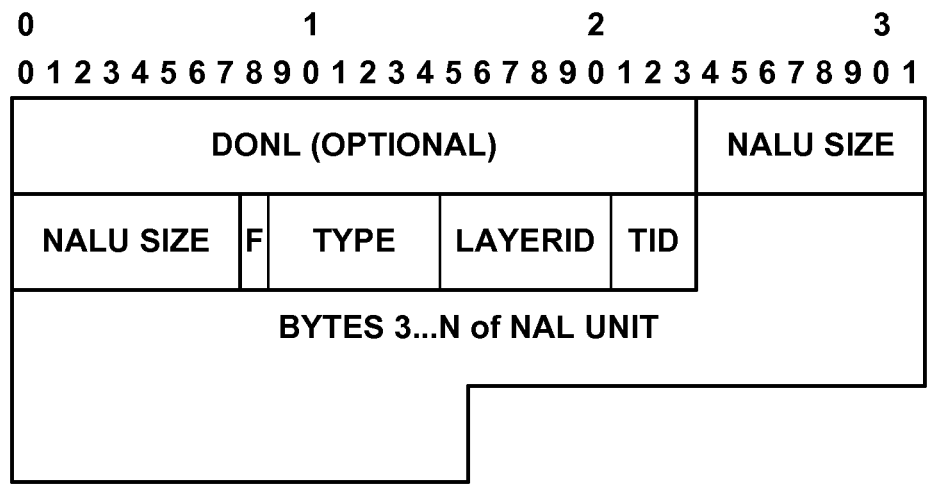
FIG. 4 is a conceptual diagram showing the structure of the first aggregation unit in an aggregation packet.

FIG. 4 is a conceptual diagram showing the structure of the first aggregation unit in an aggregation packet. The first aggregation unit in an AP includes an optional 16-bit Decoding Order Number Lower (DONL) field (in network byte order). The semantics of the DONL field may be the same as those presented in U.S. application Ser. No. 14/228,164, filed on Mar. 27, 2014. More specifically, the value of the DONL field, when present in an RTP packet payload, is equal to the value of the 16 least significant bits of the decoding order number of the corresponding NAL unit.

The first aggregation unit in the AP, as shown in FIG. 4, also includes a 16-bit unsigned field (the "NALU Size" field) containing size information (in network byte order) that indicates the size of the NAL unit in bytes. The size information within the NALU Size field excludes the two octets of bits associated with the NALU Size field but includes the bits associated with the NAL unit header within the NAL unit itself.

As shown in FIG. 4, the NALU Size field is followed by the NAL unit itself which, as mentioned above, includes the NAL unit header and the NAL unit payload. That is, the aggregation unit consists of the DONL field indicating the decoder order number of the contained NAL unit, a size field (e.g., the NALU Size field) indicating the size of the contained NAL unit, and the NAL unit itself.

If the transmission mode is equal to "MST" and/or the value of the sprop-depack-buf-nalus parameter is greater than 0, the DONL field is present in the first aggregation unit in an AP. Furthermore, if the transmission mode is equal to "MST" and/or the value of the sprop-depack-buf-nalus parameter is greater than 0, each subsequent aggregation unit in the AP will include a Decoding Order Number Difference (DOND) field. When present in a subsequent aggregation unit of an AP, the value of the DOND field indicates the difference between the decoding order number value of the current aggregated NAL unit (e.g., the NAL unit in the current aggregation unit) and decoding order number value of the preceding aggregated NAL unit in the same AP (e.g., the NAL unit in the preceding aggregation unit).

Such a design of an RTP payload format in general, or the HEVC RTP payload format specifically, has the following problem. In order to encapsulate a single NAL unit into an RTP packet when multi-stream transmission (MST) is used and/or when interleaved packetization is in use (e.g., in either SST or MST) as indicated by, e.g., the sprop-depack-buf-nalus parameter, an AP has to be used (e.g., single NAL unit packets cannot be used). That is, because the RTP receiver provides NAL units to a video decoding unit based at least in part on the decoding order number, NAL units sent out of decoding order number should be sent with a corresponding decoder order number. However, the single NAL unit packet format for an RTP payload does not include an indication of decoding order number. Thus, the single NAL unit would have to be sent in an RTP packet having an RTP payload that is structured as an AP.

The use of APs for sending a single NAL unit in an RTP packet requires inclusion of the two bytes associated with the NAL unit size field (e.g., the NALU Size field of FIG. 4) as well as repeating of the two-byte NAL unit header. When an AP contains only a single aggregation unit, the size of the aggregated NAL unit is unnecessary. That is, because a de-packetization module does not need to differentiate between multiple aggregation units within the AP (e.g., because there is only one aggregation unit), there is no need to specify the length of the aggregated NAL unit. Furthermore, the inclusion of both the RTP payload header (the payload header shown in FIG. 3) and the NAL unit header (the F field, Type field, LayerID field, and TID field shown in FIG. 4) is redundant. That is, an AP that includes a single NAL unit will have an RTP payload header that is almost the same as the NAL unit header of the only aggregated NAL unit. The only difference will be the value of the Type field. In the RTP payload header, the value of the Type field will be 48 (e.g., to signify that the RTP payload is an AP) while in the NAL unit header, the value of the Type field may be different (e.g., to indicate the NAL unit type). Thus, when interleaving packetization is enabled and/or when operating in a multi-stream transmission mode (e.g., when in MST mode in RTP), four bytes are wasted for each packet containing a single NAL unit. In other words, for every AP sent that contains only a single aggregation unit, four bytes of data are unneeded.

As such, a problem with this design for the RTP payload format is that, under MST mode and/or when the value of the sprop-depack-buf-nalus parameter is greater than 0, and when an RTP payload for a single NAL unit is transmitted, the payload for the RTP packet has to be encapsulated as an AP that contains the single NAL unit. This results in an RTP payload that has an RTP payload header with a length of 16 bits, a DONL field with a length of 16 bits, and a NALU Size field with a length of 16 bits followed by the NAL unit (which itself includes a separate (i.e., separate from the RTP payload header) NAL unit header of 16 bits). In contrast, the RTP payload associated with single NAL unit packets that are allowed in SST mode (according to the previous RTP payload format for HEVC), does not include a DONL field or a NALU Size field. Rather, as noted above, the RTP payload header of a single NAL unit packet is the first 2 bytes (e.g., the NAL unit header) of the contained NAL unit. In scenarios in which the MST mode is utilized for transmission, and/or when the sprop-depack-buf-nalus parameter has a value greater than 0, sending single NAL units may inhibit bandwidth and/or decrease transmission efficiency because 4 bytes (namely the 2-byte RTP payload header of the AP and the 2 byte NALU Size field of the single aggregation unit within the AP) are needlessly encapsulated and transmitted.

In view of these problems, this disclosure provides a modified single NAL unit packet RTP payload structure such that the single NAL unit packet can be used in the MST mode and/or when the sprop-depack-buf-nalus parameter has a value greater than 0. That is, the modified single NAL unit packet structure may enable more efficient transmission of single NAL units when interleaved packetization is enabled and/or when performing a multi-stream transmission mode (such as MST mode for RTP) while maintaining efficient transmission of single NAL units when operating in the SST mode with interleaved packetization disabled. More generally, techniques are disclosed wherein a single NAL unit packet can include decoding order count or decoding order number (DON) information (e.g., the 2-byte DONL field).

As one example, the DONL field may be included immediately after the 2-byte NAL unit header and immediately before the NAL unit payload. The DON information is present in each single NAL unit packet if performing a multi-stream transmission (e.g., if the RTP transmission mode is equal to "MST") and/or if interleaving is enabled (e.g., if the sprop-depack-buf-nalus parameter is greater than 0), and is not present otherwise. With such a change to the single NAL unit packet structure, single NAL unit packets may be used in both a unicast mode (with or without interleaving) and in a multi-stream transmission mode. In this way, an indication of DON information for a NAL unit may, when needed, be sent along with the NAL unit, while decreasing the amount of information sent. That is, including the optional DONL field in single NAL unit packets may increase efficiency of video data transmission (e.g., when using RTP).

Figure 5:
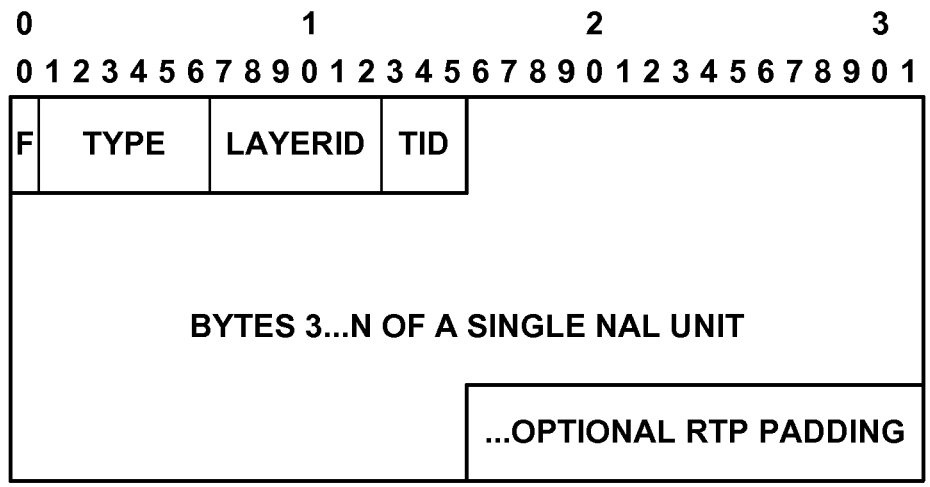
FIG. 5 is a conceptual diagram showing the structure of an RTP payload format for a single NAL unit packet.

The RTP payload format for a single NAL unit packet which can only be used during SST with no interleaving in accordance with the previous RTP payload format for HEVC is shown in FIG. 5. As can be seen in FIG. 5, no DON information is present within the RTP payload.

Figure 6:
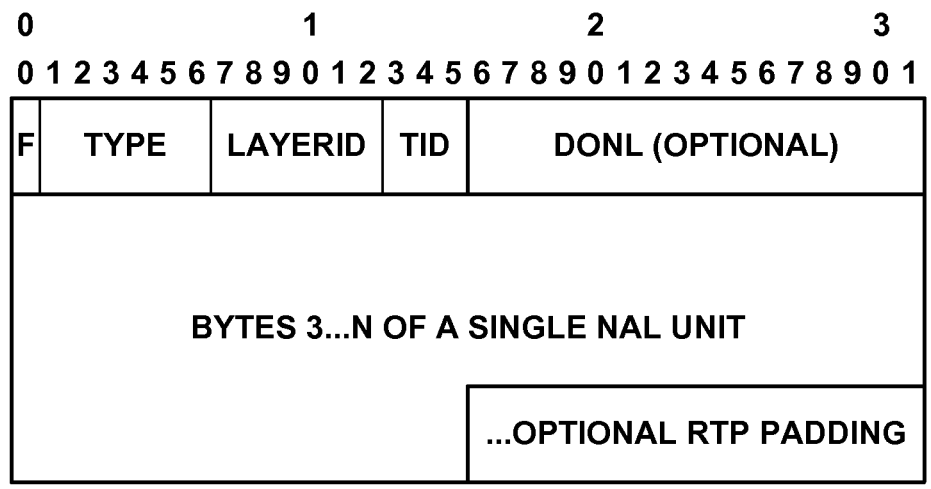
FIG. 6 is a conceptual diagram showing an example of an RTP payload format for a single NAL unit packet according to the techniques of the disclosure.

FIG. 6 is a conceptual diagram showing an example of an RTP payload format for a single NAL unit packet according to the techniques of the disclosure. As shown in FIG. 6, the modified single NAL unit packet RTP payload structure includes a DONL field. The DONL field is "optional" in that the DONL field is signaled for a single NAL unit packet when performing a multi-stream transmission (e.g., when the transmission mode is equal to "MST") and/or when interleaving is enabled (e.g., the sprop-depack-buf-nalus parameter has a value greater than 0). That is, for RTP, if the value of the sprop-depack-buf-nalus parameter is greater than 0, and/or the transmission mode is equal to "MST", the DONL field is included within the RTP payload. Otherwise, the DONL is not present. In other words, the DONL field is not present in the modified single NAL unit packet when the transmission mode is equal to "SST" and the value of the sprop-depack-buf-nalus parameter is equal to 0.

As shown in the example of FIG. 6, the optional DONL field may be encapsulated within the NAL unit itself. That is, when present in the modified single NAL unit packet, the DONL field may be encapsulated immediately after the NAL unit header and immediately before the NAL unit payload. In this way, the information in the NAL unit header may function as both the RTP payload header and the NAL unit header.

Figure 7:
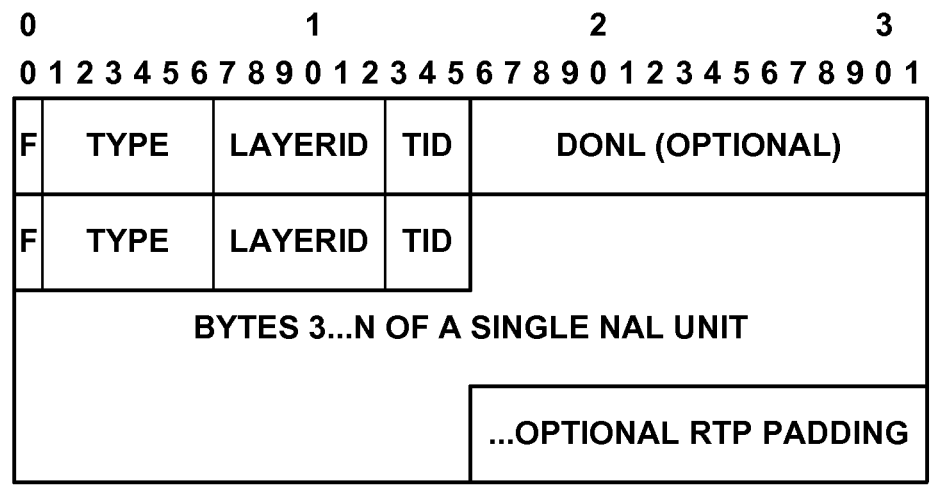
FIG. 7 is a conceptual diagram showing another example of an RTP payload format for a single NAL unit packet according to the techniques of the disclosure.

FIG. 7 is a conceptual diagram showing another example of an RTP payload format for a single NAL unit packet according to the techniques of the disclosure. The single NAL unit packet shown in the example of FIG. 7 also includes the optional DONL field. That is, the DONL field as shown in FIG. 7 may be present when performing a multi-stream transmission (e.g., the transmission mode is equal to "MST") and/or when interleaving is enabled (e.g., the value of the sprop-depack-buf-nalus parameter is not equal to 0). The DONL field as shown in FIG. 7 may not be present otherwise.

In the example of FIG. 7, the single NAL unit is part of the RTP payload following the DONL field. In this case, the first 2 bytes of the NAL unit (e.g., the NAL unit header) are repeated before the DONL field (e.g., as the RTP payload header), thereby saving 2-bytes when compared to using an AP to send a single NAL unit. The example single NAL unit of FIG. 7 also provides the advantage of not separating the first two bytes of the NAL unit from the rest of the NAL data with the DONL field in between. In other words, the modified single NAL unit packet may include decoding order number information in various locations. The example single NAL unit packet of FIG. 6 includes the DONL field between the NAL unit header and the NAL unit payload. The example single NAL unit packet of FIG. 7 includes the DONL field prior to the NAL unit header (e.g., prior to the NAL unit) and includes a duplicate of the NAL unit header (e.g., the first two bytes of the NAL unit) prior to the DONL field. Duplicating the information of the NAL unit header to create an RTP payload header, as shown in the example of FIG. 7, may provide the necessary RTP payload header while avoiding separation of the NAL unit header and NAL unit payload.

The techniques for single NAL unit coding in an RTP payload format of this disclosure may be performed by a video encoder, video decoder, media aware network element (MANE), and other video and/or network processing hardware. The following diagrams describe example structures, including video encoder 20, video decoder 30, MANE 29, server device 152, routing device 154A, transcoding device 156, routing device 154B, and client device 158 that may implement the techniques of this disclosure.

Figure 8:
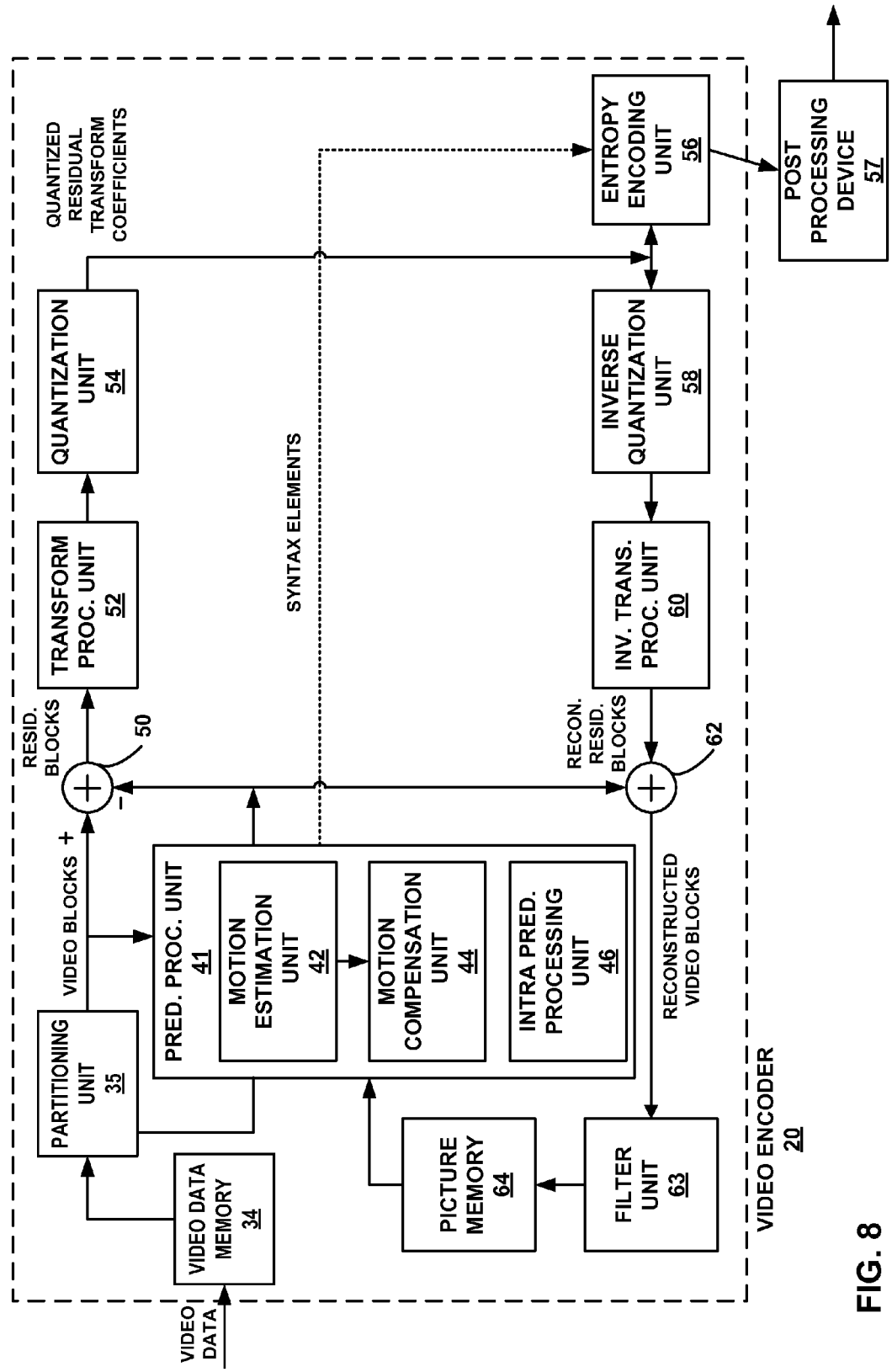
FIG. 8 is a conceptual diagram illustrating an example video encoder that may implement the techniques described in this disclosure.

FIG. 8 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 8, video encoder 20 includes video data memory 34, a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra prediction unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 8 as being an in loop filter, in other configurations, filter unit 63 may be implemented as a post loop filter. FIG. 8 also shows post processing device 57 which may perform additional processing on encoded video data generated by video encoder 20. The techniques of this disclosure may in some instances be implemented by video encoder 20. In other instances, however, the techniques of this disclosure may be implemented by post processing device 57.

Video data memory 34 may store video data to be encoded by the components of video encoder 20. The video data stored in video data memory 34 may be obtained, for example, from video source 18. Picture memory 64 may be a reference picture memory that stores reference video data for use in encoding video data by video encoder 20, e.g., in intra- or inter-coding modes. Video data memory 34 and picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 34 and picture memory 64 may be provided by the same memory device or separate memory devices. In various examples, video data memory 34 may be on-chip with other components of video encoder 20, or off-chip relative to those components.

As shown in FIG. 8, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector, along with other syntax elements, to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In accordance with the techniques described herein, video encoder 20 and/or post processing device 57 may encapsulate encoded video data for transmission to one or more other devices (e.g., using RTP). For instance, Post processing device 57 may receive encoded HEVC video data (e.g., NAL units), and generate packets (e.g., RTP packets) having payloads adhering to a particular payload format for HEVC (e.g., the RTP payload format for HEVC) by encapsulating the video data into a single network abstraction layer (NAL) unit packet (e.g., for an RTP session). Post processing device 57 may also encapsulate decoding order number information (e.g., the DONL) in the single NAL unit packet based on at least one of: the session being a multi-stream transmission (e.g., an RTP session being in a multi-stream transmission (MST) mode), or a maximum number of NAL units that may precede the NAL unit in a de-packetization buffer in reception order and follow the NAL unit in decoding order being greater than 0.

Figure 9:
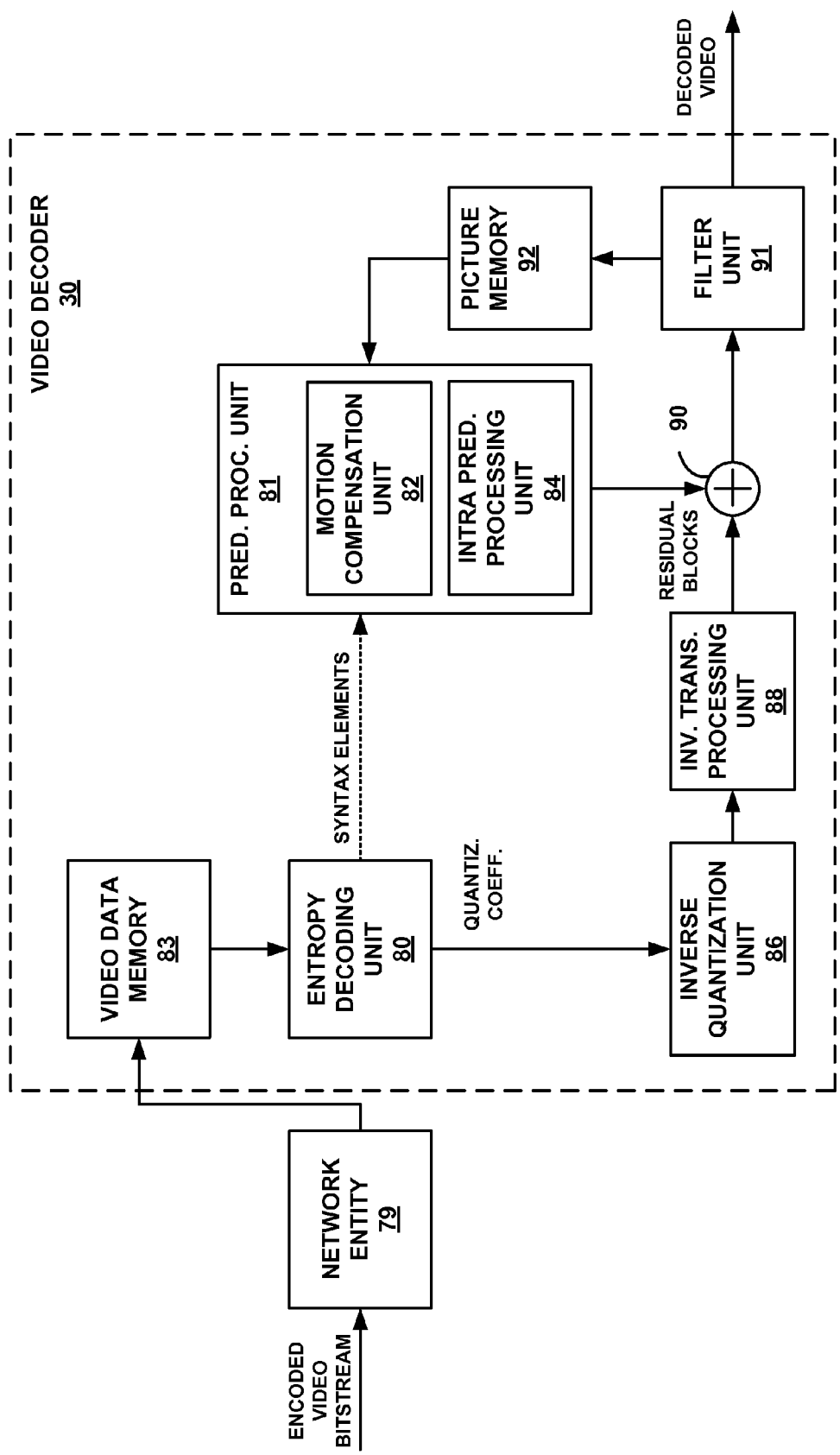
FIG. 9 is a block diagram illustrating an example video decoder that may implement the techniques described in this disclosure.

FIG. 9 is a block diagram illustrating an example video decoder 30 that may implement the techniques described in this disclosure. In the example of FIG. 9, video decoder 30 includes video data memory 83, an entropy decoding unit 80, prediction processing unit 81, inverse quantization unit 86, inverse transformation unit 88, summer 90, filter unit 91, and picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 8.

Video data memory 83 may store video data, such as an encoded video bitstream, to be decoded by the components of video decoder 30. The video data stored in video data memory 83 may be obtained, for example, from a computer-readable medium, e.g., from a local video source, such as a camera, via wired or wireless network communication of video data, or by accessing physical data storage media. Video data memory 83 may form a coded picture buffer (CPB) that stores encoded video data from an encoded video bitstream. Picture memory 92 may, in some examples be a reference picture memory that stores reference video data for use in decoding video data by video decoder 30, e.g., in intra- or inter-coding modes. Video data memory 83 and picture memory 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 83 and picture memory 92 may be provided by the same memory device or separate memory devices. In various examples, video data memory 83 may be on-chip with other components of video decoder 30, or off-chip relative to those components.

During the decoding process, video decoder 30 receives an encoded video bitstream that represents video blocks of an encoded video slice and associated syntax elements from video encoder 20. Video decoder 30 may receive the encoded video bitstream from a network entity 79. Network entity 79 may, for example, be a server, a MANE, a video editor/splicer, an RTP receiver, or other such device configured to implement one or more of the techniques described above. Network entity 79 may or may not include video encoder 20. As described above, some of the techniques described in this disclosure may be implemented by network entity 79 prior to network entity 79 transmitting the encoded video bitstream to video decoder 30. In some video decoding systems, network entity 79 and video decoder 30 may be parts of separate devices, while in other instances, the functionality described with respect to network entity 79 may be performed by the same device that comprises video decoder 30.

During the decoding process, video decoder 30 receives an encoded video bitstream that represents video blocks of an encoded video slice and associated syntax elements from video encoder 20. The video blocks may, for example, be routed from video encoder 20 to video decoder 30 via one or more MANEs, such as MANE 29 in FIG. 1 or network entity 79 in FIG. 9. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transformation unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transformation unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 9 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as display device 32 of FIG. 1.

In accordance with the techniques described herein, network entity 79 and/or video decoder 30 may decapsulate encoded video data that was encapsulated for transmission to one or more other devices (e.g., using RTP). For instance, network entity 79 may receive one or more packets (e.g., RTP packets) including encoded HEVC video data (e.g., NAL units). The packets may have payloads adhering to a particular payload format for HEVC (e.g., the RTP payload format for HEVC). In order to process the video data, network entity 79 may decapsulate video data encapsulated into a single network abstraction layer (NAL) unit packet. Network entity 79 and/or video decoder 30 may also decapsulate decoding order number information (e.g., a DONL) encapsulated in the single NAL unit packet based on at least one of: the session being a multi-stream transmission (e.g., an RTP session being in a multi-stream transmission (MST) mode), or a maximum number of NAL units that may precede the NAL unit in a de-packetization buffer in reception order and follow the NAL unit in decoding order being greater than 0. After the video data (e.g., the NAL unit) and the DON information is obtained, video decoder 30 may process the encoded video data.

Figure 10:
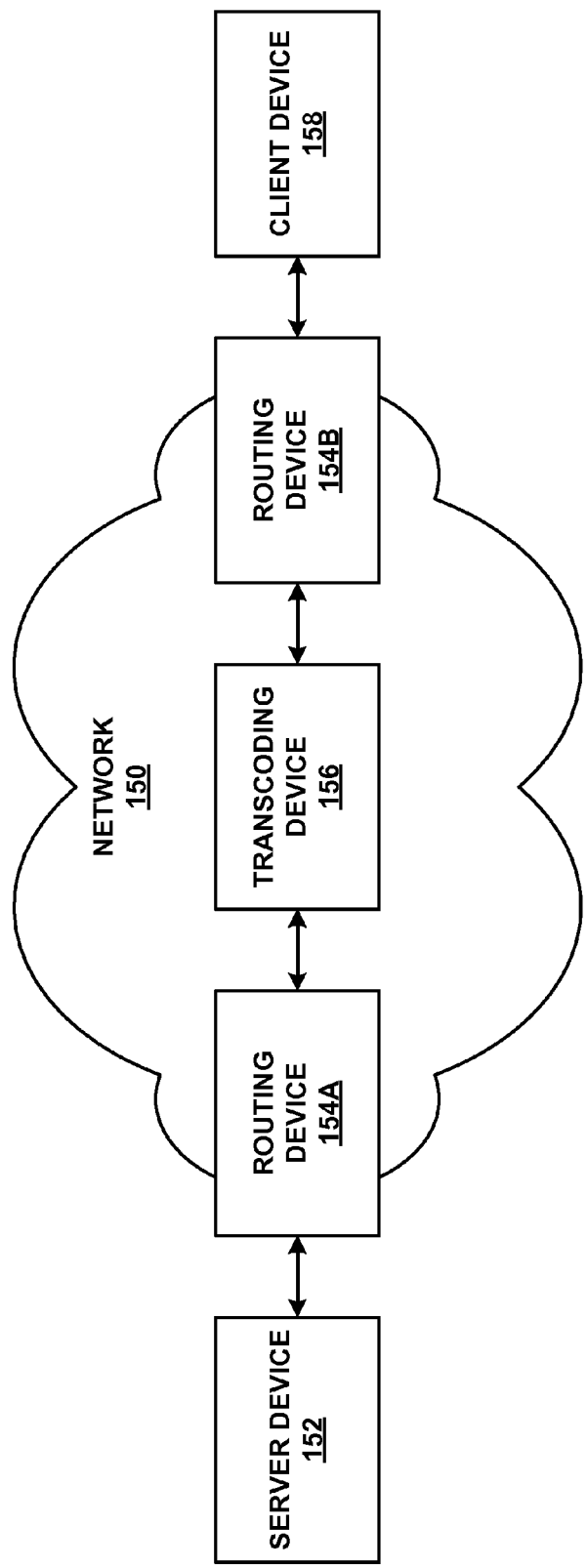
FIG. 10 is a block diagram illustrating an example set of devices that form part of a network.

FIG. 10 is a block diagram illustrating an example set of devices that form part of network 150. In this example, network 150 includes routing devices 154A, 154B (routing devices 154) and transcoding device 156. Routing devices 154 and transcoding device 156 are intended to represent a small number of devices that may form part of network 150. Other network devices, such as switches, hubs, gateways, firewalls, bridges, and other such devices may also be included within network 150. Moreover, additional network devices may be provided along a network path between server device 152 and client device 158. Server device 152 may correspond to source device 12 (FIG. 1), while client device 158 may correspond to destination device 14 (FIG. 1), in some examples. Routing devices 154 may, for example, be MANEs configured to route media data.

In general, routing devices 154 implement one or more routing protocols to exchange network data through network 150. In general, routing devices 154 execute routing protocols to discover routes through network 150. By executing such routing protocols, routing device 154B may discover a network route from itself to server device 152 via routing device 154A. The various devices of FIG. 10 represent examples of devices that may implement the techniques of this disclosure and may be configured to process RTP data in accordance with the techniques of this disclosure.

For instance, one or more of server device 152, routing devices 154, transcoding device 156, or client device 158 may process video data in a data unit payload (e.g., in a real-time transport protocol (RTP) payload) by encapsulating the video data in a single network abstraction layer (NAL) unit packet (e.g., for an RTP session) and encapsulating decoding order number information in the single NAL unit packet based on at least one of: the session being a multi-stream transmission (e.g., the RTP session being in a multi-stream transmission (MST) mode), or a maximum number of NAL units that may precede the NAL unit in a de-packetization buffer in reception order and follow the NAL unit in decoding order being greater than 0.

The single NAL unit packet may, as part of the RTP session, be transmitted to one or more others of server device 152, routing devices 154, transcoding device 156, or client device 158. Upon receipt of the RTP packet that includes an RTP payload formatted as a single NAL unit packet, the receiving device may process the video data by decapsulating the video data that is encapsulated in the single NAL unit packet and decapsulating the decoding order number information that is encapsulated in the single NAL unit packet based on at least one of: the RTP session being in a multi-stream transmission (MST) mode, or a maximum number of NAL units that may precede the NAL unit in a de-packetization buffer in reception order and follow the NAL unit in decoding order being greater than 0.

Figure 11:
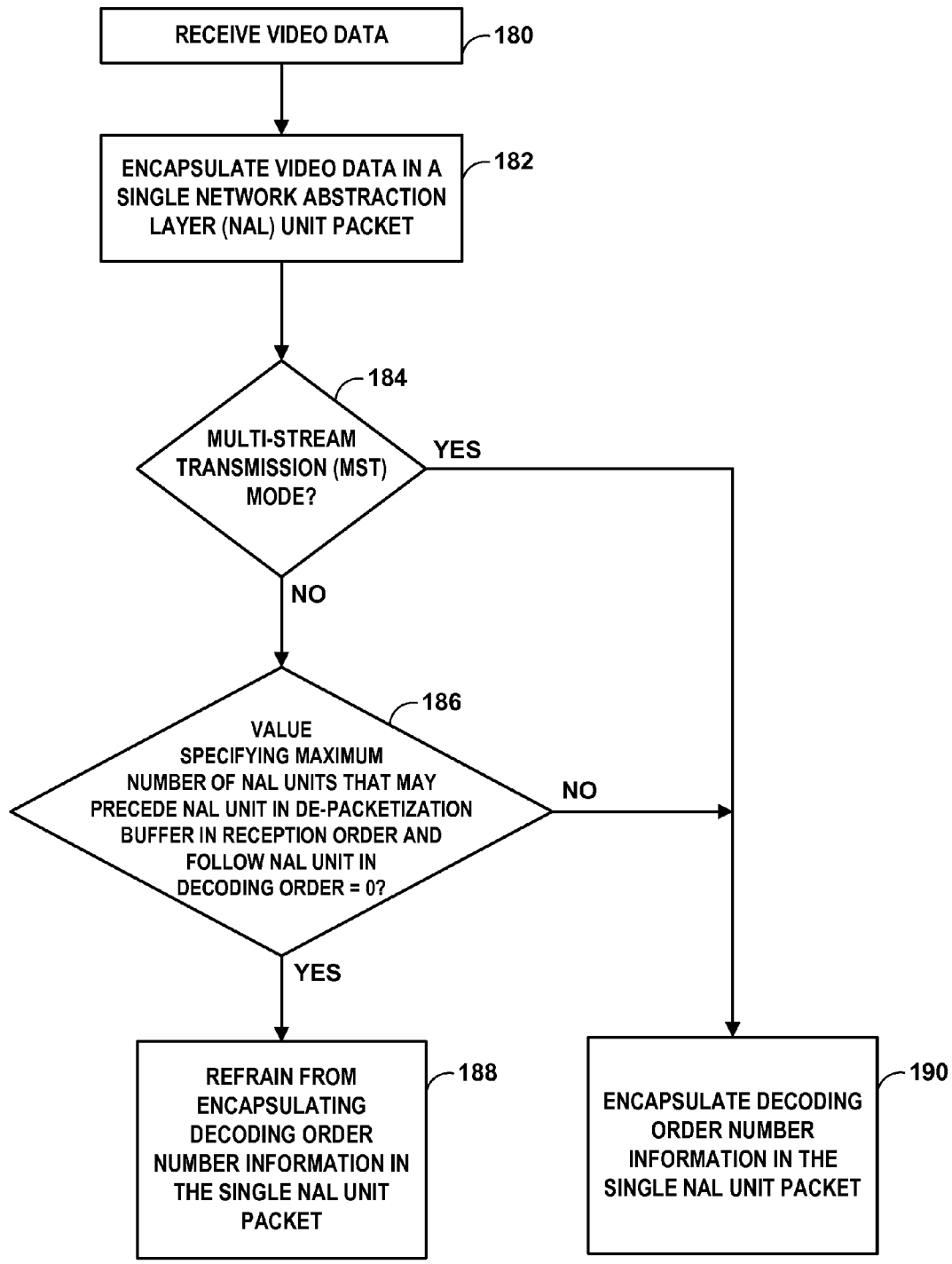
FIG. 11 is a flow diagram illustrating example operations for encapsulating video data in an RTP payload format according to the techniques of the disclosure.

FIG. 11 is a flow diagram illustrating example operations for encapsulating video data in an RTP payload format according to the techniques of the disclosure. For purposes of illustration only, the example operations of FIG. 11 are described below within the context of FIG. 1.

In the example of FIG. 11, an RTP encapsulation unit (e.g., output interface 22) may receive video data (180). For instance, the video data may be encoded (e.g., by video encoder 20) into a single NAL unit in accordance with the HEVC standard or another video coding scheme. In some examples, the NAL unit may include NAL unit payload data and a NAL unit header. In order to generate an RTP payload, output interface 22 may encapsulate the video data in a single NAL unit packet (182).

Output interface 22 may determine whether the RTP transmission is in MST mode (184). If the transmission is in MST mode ("YES" branch of 184), output interface 22 may determine whether a maximum number of NAL units that may precede the NAL unit in a de-packetization buffer in reception order and follow the NAL unit in decoding order is equal to zero (186). For instance, output interface 22 may determine whether the value of the sprop-depack-buf-nalus parameter of the RTP transmission is equal to zero. If the value is equal to zero ("YES" branch of 186), output interface 22 may refrain from encapsulating the decoding order number information in the single NAL unit packet (188).

In the example of FIG. 11, if the RTP transmission is in MST mode ("NO" branch of 184) and/or if the maximum number of NAL units that may precede the NAL unit in the de-packetization buffer in reception order and follow the NAL unit in decoding order is greater than zero ("YES" branch of 186), output interface 22 may encapsulate the decoding order number information into the single NAL unit packet (190). In some examples, in order to encapsulate the decoding order number information in the single NAL unit packet, output interface 22 may encapsulate the decoding order number information in the single NAL unit packet between the NAL unit header and the NAL unit payload data. In some examples, output interface 22 may encapsulate the decoding order number information in the single NAL unit packet before the NAL unit and encapsulate an RTP payload header before the decoding order number information. The encapsulated RTP payload header may comprise information included in the NAL unit header.

Figure 12:
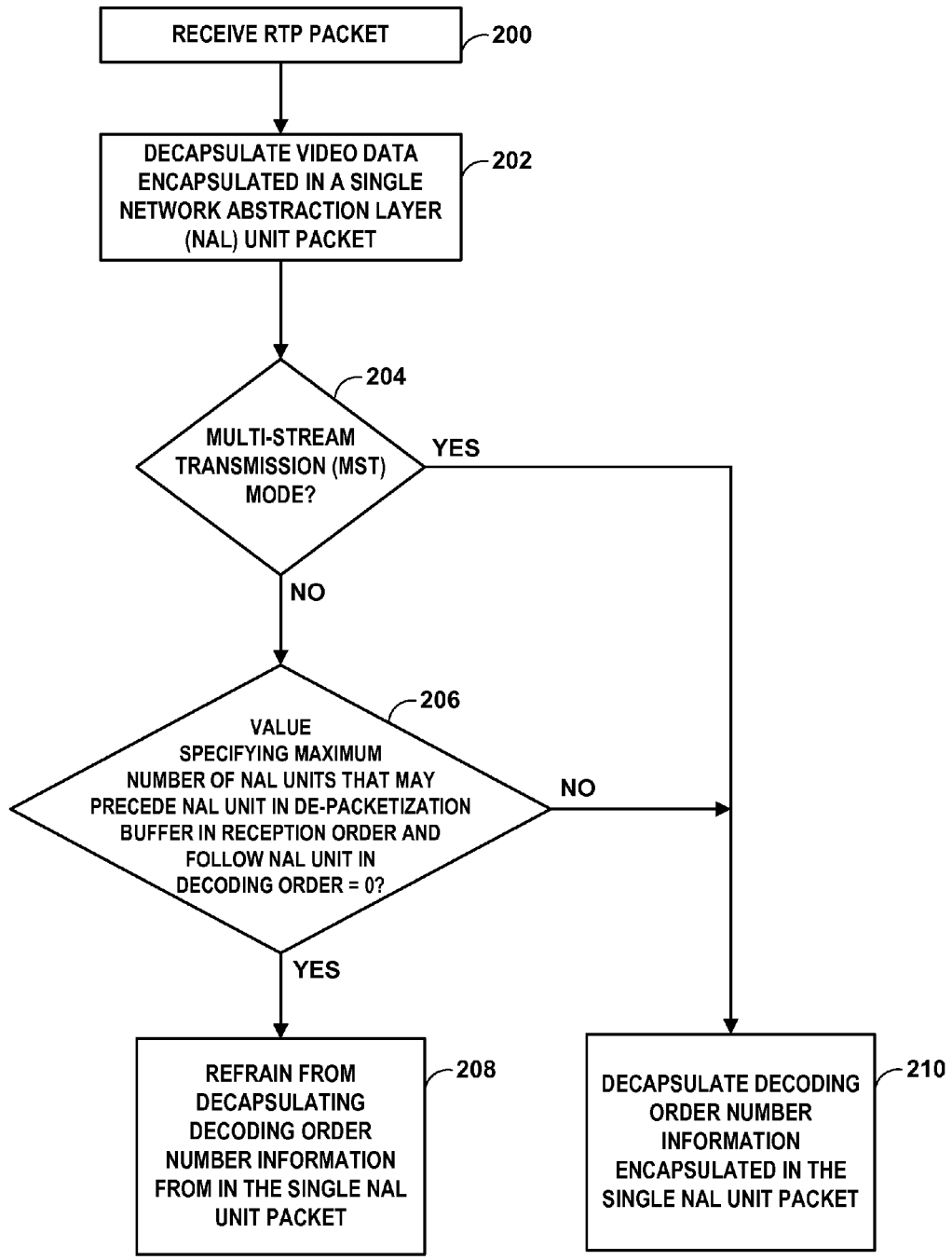
FIG. 12 is a flow diagram illustrating example operations for decapsulating video data encapsulated in an RTP payload format according to the techniques of the disclosure.

FIG. 12 is a flow diagram illustrating example operations for decapsulating video data encapsulated in an RTP payload format according to the techniques of the disclosure. For purposes of illustration only, the example operations of FIG. 12 are described below within the context of FIG. 1.

In the example of FIG. 12, an RTP decapsulation unit (e.g., input interface 28) may receive an RTP packet (200). For instance, the RTP packet may include an RTP payload formatted as a single NAL unit packet. That is, the RTP payload may include a single NAL unit in the RTP payload. In some examples, the NAL unit may include NAL unit payload data and a NAL unit header. In order to obtain the video data encapsulated therein, input interface 28 may decapsulate the video data that is encapsulated in the single network abstraction layer (NAL) unit packet (202).

Input interface 28 may determine whether the RTP transmission is in MST mode (204). If the transmission is in MST mode ("YES" branch of 204), input interface 28 may determine whether a maximum number of NAL units that may precede the NAL unit in a de-packetization buffer in reception order and follow the NAL unit in decoding order is equal to zero (206). For instance, input interface 28 may determine whether the value of the sprop-depack-buf-nalus parameter of the RTP transmission is equal to zero. If the value is equal to zero ("YES" branch of 206), input interface 28 may refrain from decapuslating decoding order number information from the single NAL unit packet (208).

In the example of FIG. 12, if the RTP transmission is in MST mode ("NO" branch of 204) and/or if the maximum number of NAL units that may precede the NAL unit in the de-packetization buffer in reception order and follow the NAL unit in decoding order is greater than zero ("YES" branch of 206), input interface 28 may decapsulate decoding order number information encapsulated in the single NAL unit packet (210). In some examples, the decoding order number information may be encapsulated in the single NAL unit packet between the NAL unit header and the NAL unit payload data. In order to decapsulate the decoding order number information in the single NAL unit packet, input interface 28 may decapsulate the decoding order number information encapsulated in the single NAL unit packet between the NAL unit header and the NAL unit payload data. In some examples, the decoding order number information may be encapsulated in the single NAL unit packet before the NAL unit and an RTP payload header may be encapsulated in the single NAL unit packet before the decoding order number information. The encapsulated RTP payload header may comprise information included in the NAL unit header. In order to decapsulate the decoding order number information encapsulated in the single NAL unit packet before the NAL unit, input interface 28 may decapsulate the decoding order number information encapsulated in the single NAL unit packet before the NAL unit and decapsulate the RTP payload header encapsulated in the single NAL unit packet before the decoding order number information.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data in a real-time transport protocol (RTP) payload, the method comprising:
   encapsulating video data in an RTP packet for an RTP session, wherein a type field for the RTP packet indicates the RTP packet contains a single NAL unit of video coding layer data; and
   encapsulating decoding order number information in the RTP packet containing the single NAL unit of video coding layer data based on at least one of: the RTP session being in a multi-stream transmission (MST) mode, or a maximum number of NAL units that may precede the NAL unit in a de-packetization buffer in reception order and follow the NAL unit in decoding order being greater than 0.

2. The method of claim 1, wherein the single NAL unit comprises a NAL unit header and NAL unit payload data, and wherein encapsulating the decoding order number information in the RTP packet comprises encapsulating the decoding order number information in the RTP packet between the NAL unit header and the NAL unit payload data.

3. The method of claim 1, wherein the single NAL unit comprises a NAL unit header and NAL unit payload data, and wherein encapsulating the decoding order number information in the RTP packet comprises encapsulating the decoding order number information in the RTP packet before the single NAL unit, the method further comprising:
   encapsulating, in the RTP packet, an RTP payload header before the decoding order number information, wherein the RTP payload header comprises information included in the NAL unit header.

4. The method of claim 1, further comprising:
   refraining from encapsulating the decoding order number information in the RTP packet based on the RTP session being in a single-stream transmission (SST) mode and the maximum number of NAL units that may precede the NAL unit in the de-packetization buffer in reception order and follow the NAL unit in decoding order being equal to 0.

5. The method of claim 1, wherein the maximum number of NAL units that may precede the NAL unit in the de-packetization buffer in reception order and follow the NAL unit in decoding order is represented by a value of a syntax element specified during setup of the RTP session.

6. The method of claim 5, wherein the syntax element comprises the sprop-depack-buf-nalus parameter.

7. A method of processing video data in a real-time transport protocol (RTP) payload, the method comprising:
   decapsulating video data that is encapsulated in a single network abstraction layer (NAL) unit packet for an RTP session, wherein a type field for the RTP packet indicates the RTP packet contains a single NAL unit of video coding layer data; and
   decapsulating decoding order number information that is encapsulated in the RTP packet containing the single NAL unit of video coding layer data based on at least one of: the RTP session being in a multi-stream transmission (MST) mode, or a maximum number of NAL units that may precede the NAL unit in a de-packetization buffer in reception order and follow the NAL unit in decoding order being greater than 0.

8. The method of claim 7, wherein the single NAL unit comprises a NAL unit header and NAL unit payload data, and wherein decapsulating the decoding order number information that is encapsulated in the RTP packet comprises decapsulating the decoding order number information that is encapsulated between the NAL unit header and the NAL unit payload data.

9. The method of claim 7, wherein the single NAL unit comprises a NAL unit header and NAL unit payload data, and wherein decapsulating the decoding order number information that is encapsulated in the RTP packet comprises decapsulating the decoding order number information that is encapsulated before the single NAL unit, the method further comprising:
   decapsulating, from the RTP packet, an RTP payload header that is encapsulated in the RTP packet before the decoding order number information, wherein the RTP payload header comprises information included in the NAL unit header.

10. The method of claim 7, further comprising:
    refraining from decapsulating decoding order number information from the RTP packet based on the RTP session being in a single-stream transmission (SST) mode and the maximum number of NAL units that may precede the NAL unit in the de-packetization buffer in reception order and follow the NAL unit in decoding order being equal to 0.

11. The method of claim 7, wherein the maximum number of NAL units that may precede the NAL unit in the de-packetization buffer in reception order and follow the NAL unit in decoding order is represented by a value of a syntax element specified during setup of the RTP session.

12. The method of claim 11, wherein the syntax element comprises the sprop-depack-buf-nalus parameter.

13. An apparatus configured to process video data in a real-time transport protocol (RTP) payload, the apparatus comprising
   a memory configured to store video data, and
   one or more processors configured to:
      encapsulate, within a real-time transport protocol (RTP) payload, video data in a single network abstraction layer (NAL) unit packet for an RTP session, wherein a type field for the RTP packet indicates the RTP packet contains a single NAL unit of video coding layer data; and
      encapsulate decoding order number information in the RTP packet containing the single NAL unit of video coding layer data based on at least one of:
      the RTP session being in a multi-stream transmission (MST) mode, or a maximum number of NAL units that may precede the NAL unit in a de-packetization buffer in reception order and follow the NAL unit in decoding order being greater than 0.

14. The apparatus of claim 13, wherein the single NAL unit comprises a NAL unit header and NAL unit payload data, and wherein the processor is configured to encapsulate the decoding order number information between the NAL unit header and the NAL unit payload data.

15. The apparatus of claim 13, wherein the single NAL unit comprises a NAL unit header and NAL unit payload data, and wherein the processor configured to encapsulate the decoding order number information in the RTP packet is configured to encapsulate the decoding order number information in the RTP packet before the single NAL unit, and wherein the processor is further configured to:

encapsulate, in the RTP packet, an RTP payload header before the decoding order number information, wherein the RTP payload header comprises information included in the NAL unit header.

16. The apparatus of claim 13, wherein the processor is further configured to:

refrain from encapsulating the decoding order number information in the RTP packet based on the RTP session being in a single-stream transmission (SST) mode and the maximum number of NAL units that may precede the NAL unit in the de-packetization buffer in reception order and follow the NAL unit in decoding order being equal to 0.

17. The apparatus of claim 13, wherein the maximum number of NAL units that may precede the NAL unit in the de-packetization buffer in reception order and follow the NAL unit in decoding order is represented a value of a syntax element specified during setup of the RTP session.

18. The apparatus of claim 17, wherein the syntax element comprises the sprop-depack-buf-nalus parameter.

19. An apparatus configured to process video data in a real-time transport protocol (RTP) payload, the apparatus comprising:

means for encapsulating video data in a single network abstraction layer (NAL) unit packet for an RTP session, wherein a type field for the RTP packet indicates the RTP packet contains a single NAL unit of video coding layer data; and means for encapsulating decoding order number information in the RTP packet containing the single NAL unit of video coding layer data based on at least one of: the RTP session being in a multi-stream transmission (MST) mode, or a maximum number of NAL units that may precede the NAL unit in a de-packetization buffer in reception order and follow the NAL unit in decoding order being greater than 0.

20. The apparatus of claim 19, wherein the single NAL unit comprises a NAL unit header and NAL unit payload data, and wherein the means for encapsulating the decoding order number information in the RTP packet comprises means for encapsulating the decoding order number information between the NAL unit header and the NAL unit payload data.

21. The apparatus of claim 20, wherein the single NAL unit comprises a NAL unit header and NAL unit payload data, and wherein the means for encapsulating the decoding order number information in the RTP packet comprises means for encapsulating the decoding order number information before the single NAL unit, the apparatus further comprising:

means for encapsulating, in the RTP packet, an RTP payload header before the decoding order number information, wherein the RTP payload header comprises information included in the NAL unit header.

22. The apparatus of claim 19, further comprising:

means for refraining from encapsulating the decoding order number information in the RTP packet based on the RTP session being in a single-stream transmission (SST) mode and the maximum number of NAL units that may precede the NAL unit in the de-packetization buffer in reception order and follow the NAL unit in decoding order being equal to 0.

23. The apparatus of claim 19, wherein the maximum number of NAL units that may precede the NAL unit in the de-packetization buffer in reception order and follow the NAL unit in decoding order is represented by a value of a syntax element specified during setup of the RTP session.

24. The apparatus of claim 19, wherein the syntax element comprises the sprop-depack-buf-nalus parameter.

* * * * *